March 13, 1928.
P. E. KLOPSTEG
EDUCATIONAL APPARATUS
Filed Feb. 20, 1926
1,662,272
2 Sheets-Sheet 1
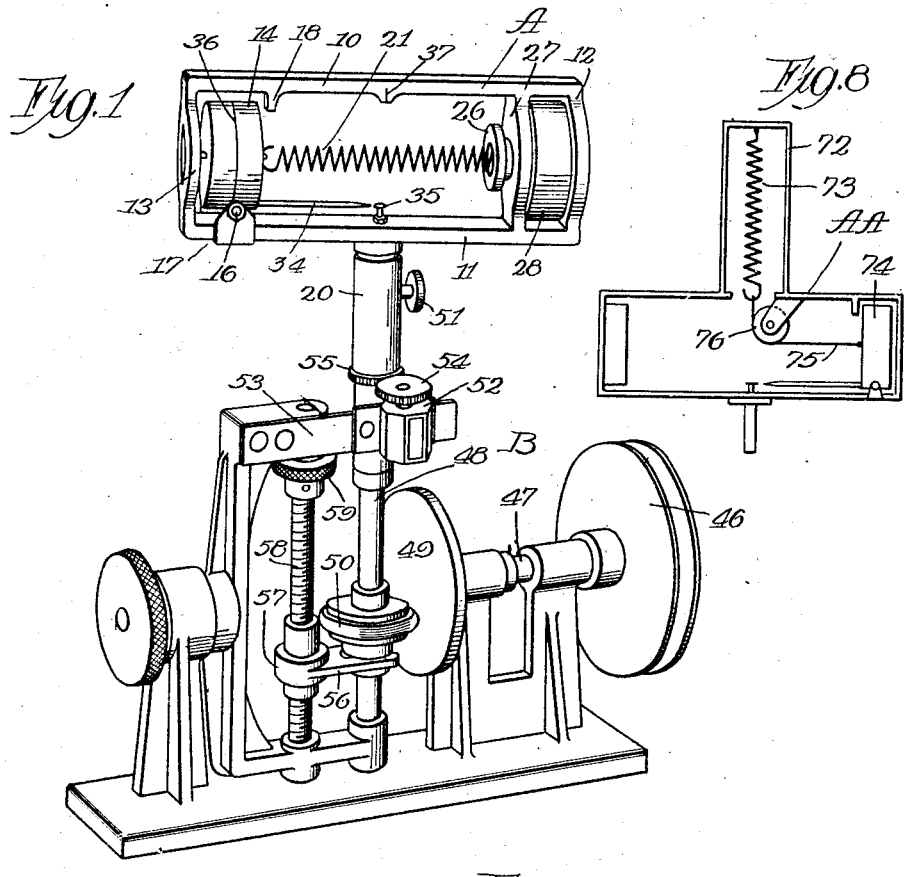
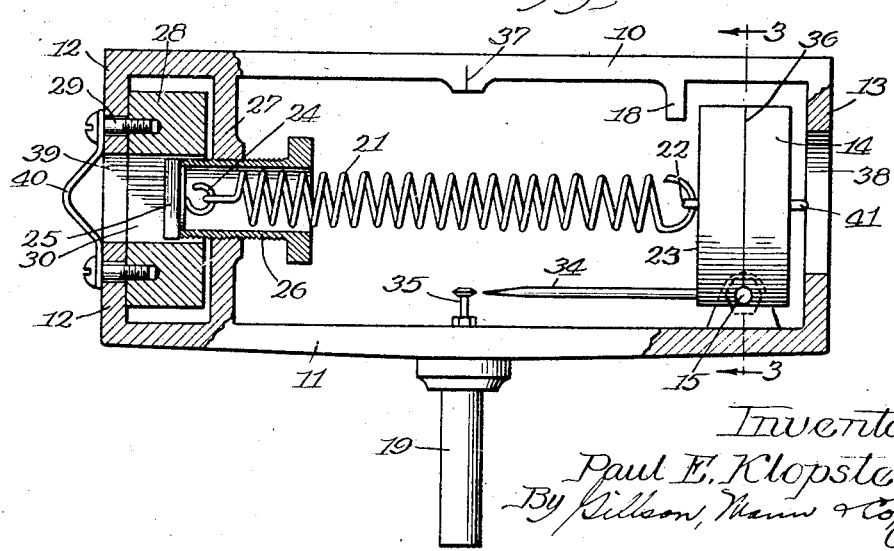
Inventor:
Paul E. Klopsteg
By Gilson, Mann & Co.
Atty's

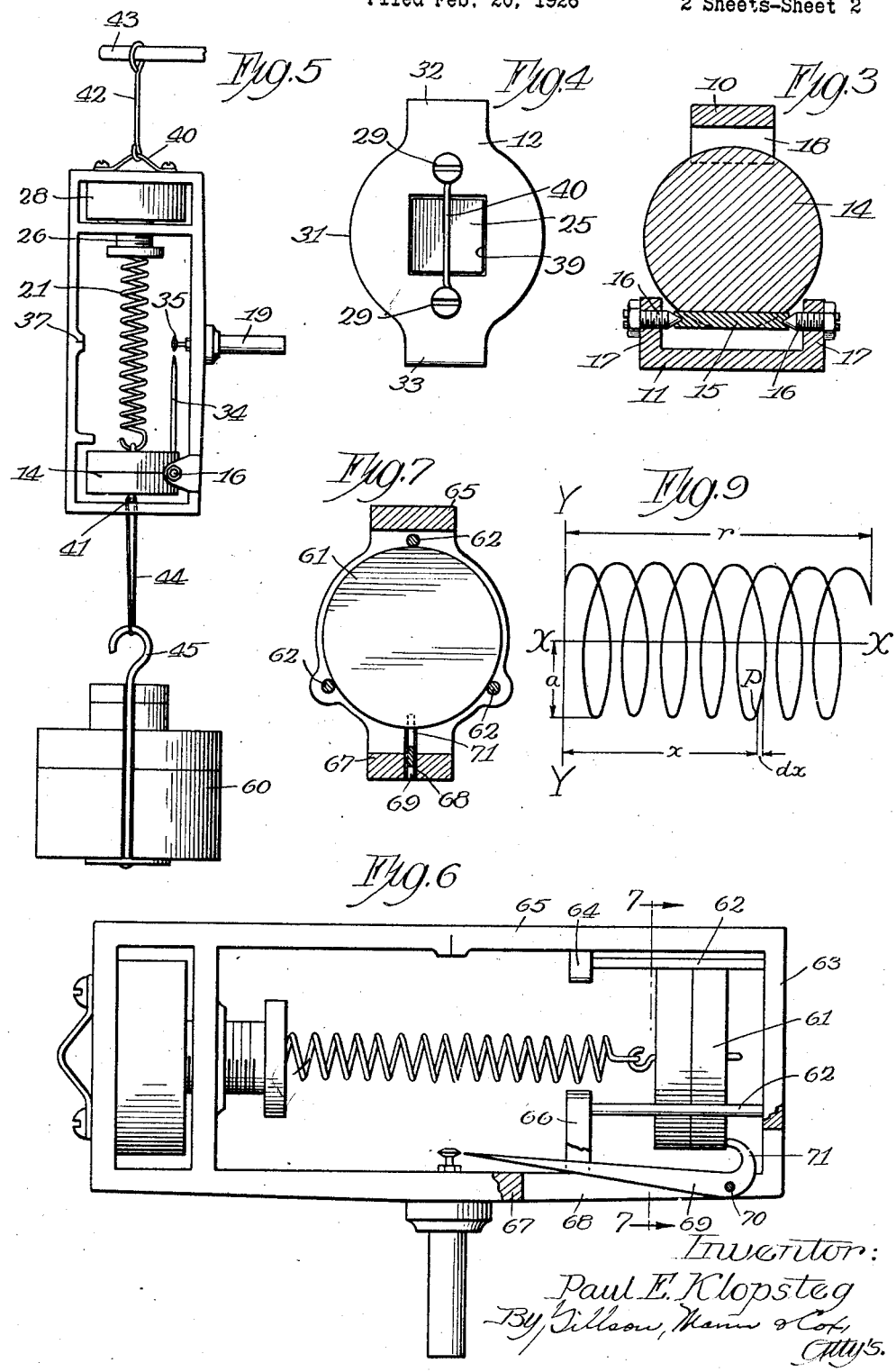

Patented Mar. 13, 1928.

1,662,272

UNITED STATES PATENT OFFICE.

PAUL E. KLOPSTEG, OF CHICAGO, ILLINOIS, ASSIGNOR TO CENTRAL SCIENTIFIC COMPANY, OF CHICAGO, ILLINOIS, A CORPORATION OF ILLINOIS.

EDUCATIONAL APPARATUS.

Application filed February 20, 1926. Serial No. 89,651.

This invention relates to laboratory apparatus of the type used in teaching physics and has for its principal objects to provide apparatus simple enough for the ordinary student to readily understand and yet capable of accurately demonstrating the relation between centripetal force and the mass, angular velocity and the radius of the path of a rotating body, usually expressed by the equation $f = m\omega^2 r$ to permit the rotating body to be maintained in a condition of equilibrium under the balanced action of centrifugal and centripetal forces; and to permit the resistance to outward movement representing centripetal force to be increased with the increase of radius of rotation.

Instructors in physics have been hampered in making illustrative experiments to demonstrate this simple relationship because the apparatus available is not well suited for the purpose. Those forms which are sufficiently simple for the student to use are incapable of giving data sufficiently close to the computed values to make the desired impression upon the student's mind, and those forms which are intended for accurate work are so complicated in design and construction and so obscure in their operation that the student is impressed with the inability of mechanical science to approach mathematical accuracy rather than the lesson which it is intended to teach by the experiment.

In most of the simple forms centripetal force is supplied by weight which, of course, has a constant value, and in approaching the angular velocity at which the weight is balanced by the centrifugal reaction of the rotated mass, the radius of rotation of the latter increases, slightly increasing the centrifugal force, and throwing the apparatus out of balance in the opposite direction. As a result, in order to maintain the condition of "average equilibrium" it is necessary to vary the rotational speed above and below that point at which theoretical balance is obtained. Or if there is apparent equilibrium at constant speed the stabilization is the result of friction; and with enough friction present to produce stability, close agreement between experimental values of centripetal and the centrifugal forces cannot be expected, and much less attained.

The preferred embodiment and several alternative forms of the invention are illustrated in the accompanying drawings in which—

Fig. 1 is a perspective view illustrating the preferred form mounted upon a conventional rotator;

Fig. 2 is a front elevation of the preferred form of a commercial unit, the ends thereof being in longitudinal section on a vertical plane;

Fig. 3 is a transverse section on the line 3—3 of Fig. 2;

Fig. 4 is an end view looking from the left in Figs. 1 and 2;

Fig. 5 is an elevation of the preferred form suspended from the support and subjected to weights for measuring the values required for equilibrium;

Fig. 6 is a side elevation of an alternative form of commercial unit;

Fig. 7 is a transverse sectional view thereof on the line 7—7 of Fig. 6;

Fig. 8 is a diagrammatic view illustrating an alternative embodiment, and

Fig. 9 is a diagram illustrating the forces developed in the spring during rotation of the apparatus.

These specific illustrations and the correspondingly specific description which follows are used to make the disclosure full and clear, and it is not intended by either of them to limit the scope of the claims other than is made necessary by the prior art.

The commercial unit capable of use with various forms of rotators includes a generally rectangular frame A comprising a top 10, bottom 11, and ends 12 and 13, made as light as possible while maintaining the necessary strength. Very satisfactory results have been had with a frame of thin aluminum equipped with a transversely arranged pin 19 (Fig. 2) projecting from the bottom and adapted to be received and secured in a socket 20 (Fig. 1) of a variable speed rotator generally indicated by B.

A cylindrical mass 14 is equipped with a pin 15 (Fig. 3) mounted upon pivot bearings 16 carried by arms 17 on the bottom 11 of the frame. The pin 15 is necessarily at one side of the center of gravity of the mass and when the pivotal axis is practically tangential to the mass, as shown, ample movement of the center of the mass is permitted, which movement is limited by end 13 of the frame and by an upright stop 18 on the top 10.

Outward movement of the mass 14 under the action of centrifugal force is resisted by a helical spring 21 with its axis in line with the center of gravity of the mass 14 and having one end hooked through an eye 22 mounted at the axis of the inner face 23 of the mass 14 and the other end engaged with a hook 24 (Fig. 2) mounted at the center of the plug 25 bearing against the end of the threaded sleeve 26 adjustably mounted in the threaded partition 27 adjacent to the end 12.

Dynamic balance is effected by a cylindrical counter weight 28 located between the partition 27 and the end 12 and secured to the latter by screws 29 and having a central opening 30 to accommodate the plug 25 in the outer end of the sleeve 26.

The intermediate portion of the ends 12 and 13 are circular as indicated at 31 in Fig. 4, to conform with the shape of the mass 14 and the counterweight 28, but the top and bottom are relatively narrow to conform with the remote portions of the ends, as indicated at 32 and 33, in Fig. 4.

The condition with respect to equilibrium is indicated by a pointer 34 carried by the mass 14 and an index button 35 having a narrow head, and mounted coaxial with the stem 19.

The mass 14 is provided with a circumferential line 36 in the plane of the center of gravity of the mass and the top 10 is provided with a line 37 in the plane of the axis of rotation and the distance between the points where these planes cut the axis of the spring represents the radius of rotation, which is easily measured with vernier calipers.

Both the ends 13 and 12 are perforated, as indicated at 38 and 39. The latter is bridged by a loop 40 secured to the end 12 by the screws 29. The opening 38 permits access to an eye 41 secured to the mass 14 in line with the center of gravity.

By means of the loop 40 and a suitable hanger 42 (Fig. 5) the frame with its associated parts may be suspended from a support 43. By means of the eye 41 and fine wire 44, a weight carrier 45 may be suspended below the mass 14.

The rotator B includes a source of power 46 for driving a shaft 47 which is connected with a vertical shaft 48 by friction gearing 49, 50, and the upper end of this shaft carries the socket 20 equipped with a set screw 51 for securing the stem 19 in the socket. A counter 52, carried by a spring 53, has a gear 54 normally held out of engagement with a gear 55 on the socket 20.

A fork 56 has a threaded hub 57 mounted on the screw 58 equipped with a knurled knob 59 permitting the friction gearing to be adjusted to vary the speed of the shaft 48 and, hence, the frame A.

The use of the apparatus is illustrated in Figs. 1 and 5. When it is desired to perform the experiment the assembly shown in Fig. 1 is set in motion and by means of the knob 59 the speed of the frame A is adjusted until the sharp end of the pointer 34 is opposite to the sharp edge of the index 35. This condition of balance is shown in the figure.

Having noted the reading of the revolution counter 52, it is engaged with the rotator spindle at a definite instant and the number of revolutions in definite intervals of time are noted. If, during the taking of a reading, the pointer 34 moves, it is an indication that the speed of the motor is varying and the knob 59 should be turned to compensate for the variation. The construction shown in the drawing is so designed as to be very sensitive to small changes in the speed and it is, therefore, not difficult to obtain values for the number of revolutions in one minute intervals which agree within one or two revolutions.

This part of the experiment having been completed the stem 19 is withdrawn from the socket and the frame A is suspended, as indicated in Fig. 5. Weights 60 are placed on the carrier 45 until the pointer 34 indicates a balance, as it did during the rotation of the apparatus, as shown in Fig. 1. Having determined the weight, including that of the mass 14, necessary to pull the spring to the point of balance, the radius of rotation is measured by a vernier caliper between the lines 36 and 37, which completes the data for the calculations.

It may be observed at this point that suspending the apparatus and weights in the manner shown the axis of the spring is automatically placed in vertical position, which is a necessary condition for accuracy in measuring directly the pull of the spring.

It is also opportune to note that by using a spring to exert the centripetal force an increase of radius of rotation of the mass effects an elongation of the spring and, consequently, increases the centripetal force simultaneously with the increase of centrifugal force due to the lengthening of the radius. The relative rate at which each of these forces shall increase with an increase of radius (but at constant speed) may be predetermined by appropriate proportioning of the parts. If the rates of increase are made equal a condition of such critical equilibrium is set up that the slightest increase in speed "throws the balance" in favor of centrifugal force, while the slightest decrease "throws the balance" in favor of centripetal force. This would make the device excessively sensitive to changes in speed in the region of balance.

If, however, the increase of centripetal force with radius, at the predetermined operating speed, is slightly greater than that of the centrifugal, the apparatus remains stable, yet very sensitive to speed variations.

The mathematics upon the data obtained, as above, may be simply stated as follows:

Let M meaning the mass 14 = mass of body being rotated.
$\omega$ = its angular velocity.
$r$ = radius of path of center of mass.
$F_c$ = centrifugal reaction of mass.
$F_s$ = centripetal force excited by spring.
$C$ = spring constant in dynes/cm.
$E$ = elongation of spring in cm.

Then, at equilibrium between the forces,
$F_s = F_c$ or
$EC = M\omega^2 r$ (Eq. 1)

$$\frac{dF_s}{dr} = C, \text{since } C \propto r \quad \text{(Eq. 2)}$$

$$\frac{dF_c}{dr} = M\omega^2 \quad \text{(Eq. 3)}$$

Equations (2) and (3) represent the respective rates of increase, with radius, of the centripetal and centrifugal forces. If these are to be equal, $$C = M\omega^2 \quad \text{(Eq. 4)}$$

But (1) must be true simultaneously; hence, if we solve (2) and (4) simultaneously we have $$E = r \quad \text{(Eq. 5)}$$

Equations (4) and (5) constitute the basis for the design. We note that we can attain the condition of stability, yet maintaining great sensitiveness to changes in speed, by making C slightly larger than $M\omega^2$. Eq. (5) shows that a spring, in order to give the results sought, must, at the condition of balance expressed in Eq. (1) be elongated an amount equal to the distance of the center of mass A from the axis.

The tension adjustment for the spring 21 is provided to enable the student to test the equation at several different values of the forces. It should be noted that at lower values of the tension than maximum, at which the critical condition is approached, the apparatus becomes less sensitive to speed variations; however, it is amply sensitive to permit accurate agreement among successive measurements of revolutions per minute.

The correction to $M\omega^2 r$ resulting from the fact that, on account of the mass of the spring, the latter elongates slightly during rotation, may be readily determined. At first thought it might seem that, since the two halves are approximately symmetrical about the axis, each is pulling outward with a force $$\frac{m}{2}\omega^2 \frac{r}{2},$$

where $m$ is the total mass and $2r$ the total length of the spring, so that the elongation might be expected to correspond to twice this force or $m\omega^2 r/2$. That the elongation, and consequently the additive correction to $F_c$ as computed from $M\omega^2 r$, is less than this amount will appear from the following analysis:

In the diagram Fig. 9, let the Y-axis represent the axis of rotation, and assume that the spring is close-wound. The following designations will be used:

$r$ = length of helix, axis of rotation to free end (approximately true, as required by Eq. 5)

$\frac{m}{2}$ = mass of spring from axis to end $a$ = radius of coil, from axis of cylinder to center of wire $n$ = number of turns per cm.

$\varphi$ = torsional coefficient, i. e., angle of twist per unit length of wire per unit torsional moment.

$e$ = elongation in cm.

The torque on any cross section of wire, at the point P, a distance $x$ from the axis, is that which results from the centrifugal force of the mass beyond P from the axis. This mass is $$\frac{m}{2}\left(1 - \frac{x}{r}\right),$$

and the center of mass of this portion is located at $(r+x)/2$. The force, which acts along the axis of the spring, acts with a moment in which the lever arm is $a$. Hence the torque on the wire at P is $$t = \frac{m}{2}\left(1 - \frac{x}{r}\right)\frac{(r+x)a\omega^2}{2}$$

In a length of wire included within the distance $dx$, namely $2 a n dx$, the angle of twist $d\Theta$ produced by the torque $t$ is $$d\Theta = 2\pi a n \varphi t dx$$
$$= \frac{\pi a^2 n m}{2}\left(1 - \frac{x}{r}\right)(r+x)dx.$$

Now $\varphi$ and C are related by the formula $$\varphi = \frac{1}{2\pi a^3 n r C};$$

and the elongation $e$ is the product of the twist in the entire length of wire comprising the spring, and the radius of the turns. Hence we may write $$e = \int a d\theta = \int_0^r \frac{m\omega^2}{4rC}\left(r - \frac{x^2}{r}\right)dx,$$

or $$e = \frac{m\omega^2 r}{6C}$$

The force corresponding to this elongation is $Ce$, and twice this force is the correction to be added to $M\omega^2 r$, because the same elongation occurs in each half of the spring—thus, $$2Ce = \frac{m\omega^2 r}{3}$$

Finally, the equation for the total force, with the spring correction included is $$F_c = \left(M + \frac{m}{3}\right)\omega^2 r \quad (6)$$

Although at different tensions of the spring the latter is not exactly symmetrical about the axis, symmetry is approximated sufficiently closely to make the above outlined method of correction valid.

Table 1 summarizes the results of three sets of measurements, made at three different values of the spring tension. The results indicate an agreement within 1% between the calculated and directly observed forces. This agreement, in fact agreement within 2%, is closer than has been attainable by means of any simple apparatus heretofore available.

Table 1.

| | Exp. 1, maximum tension of spring. | Exp. 2, medium tension of spring. | Exp. 3, minimum tension of spring. | Remarks |
|---|---|---|---|---|
| M (rotating mass), g | 196.4 | 196.4 | 195.5 | A change in M was between Exps. 2 and 3. |
| r (radius, axis to center of mass) cm. | 5.70 | 5.69 | 5.69 | Average values of 3 measurements in each case. |
| $\omega$(rad/sec)=$\frac{rpm(2\pi)}{60}$ | 56.6 | 51.5 | 48.6 | Average R. P. M. found from number of revolutions during five 1-minute intervals. |
| m (mass of spring), g | 12.0 | 12.0 | 12.0 | |
| $F_c$, grams, (computed from $(M+\frac{m}{3})\frac{\omega^2 r}{g}$ | 3740 | 3080 | 2730 | Last figure rounded. |
| Observed $F_c$, centripetal force exerted by spring, g. | 3700 | 3090 | 2700 | Apparatus sensitive to ±10 grams. |

In Fig. 6 there is shown an alternative arrangement of the centrifugal mass and pointer. The mass 61 corresponding to the mass 14 instead of being pivoted, is slidably mounted between the three rods 62, extending between the end piece 63 and a lug 64, on the top 65, and lugs 66 on the bottom 67. The bottom 67 is split at 68 and a pointer 69 is pivoted at 70 and provided with a short arm 71 lying in the path of the mass 61 as it moves outwardly under centrifugal force. The weight of the pointer together with centrifugal force normally tend to give it a counter-clockwise rotation in opposition to the action of the mass 61.

In Fig. 8 the frame AA is provided with a lateral extension 72 in which the spring 73 is mounted on an axis constant with the axis of rotation, and the free end of the spring is connected with the mass 74 by a flexible cable 75 whose direction is changed from vertical to horizontal by a rotating lever illustrated by the circular sheave 76. In this form the correction for the spring, as developed in the disclosure, becomes unnecessary, because the axis of the spring substantially coincides with the axis of rotation. The possibility of error in measuring the force by applying weights is increased, however, because of friction in the rotating lever used to transmit the force through a right angle.

In all forms of the apparatus the mass should be of simple regular geometric form to facilitate the accurate location of the center of mass.

I claim as my invention:

1. In a centrifugal instruction device, a rotating support, a mass of simple and regular geometric form rotating with the support and mounted to permit outward movement under the action of centrifugal force, means for establishing a definite radius of rotation indicating that the center of mass is located at a predetermined radius, centripetal force means opposing the outward movement of the mass with centripetal force increasing with the outward movement and means to establish measurable radius of rotation for the center of gravity of the mass of the rotating body.

2. In a centrifugal instruction device, a rotating support, a mass of simple and regular geometric form rotating with the support and mounted to permit outward movement under the action of centrifugal force, centripetal force means opposing the outward movement of the mass with centripetal force increasing with the outward movement more rapidly than the centrifugal force increases at constant angular velocity.

3. In a centrifugal instruction device, a rotating support, a mass of simple and regular geometric form rotating with the support and mounted to permit outward movement under the action of centrifugal force, centripetal force means opposing the outward movement of the mass with centripetal force increasing with the outward movement slightly more rapidly than the centrifugal force increases at constant angular velocity.

4. In a centrifugal instruction device, a rotating support, a mass of simple and regular geometric form rotating with the support and mounted to permit outward movement under the action of centrifugal force means for establishing a definite radius of rotation indicating that the center of mass is located at a predetermined radius, a spring opposing the outward movement of the mass and means to establish measurable radius of rotation for the center of gravity of the mass of the rotating body.

5. In a centrifugal instruction device, a rotating support, a mass rotating with the support and mounted to permit outward movement under the action of centrifugal force and a spring opposing the outward movement of the mass and having a constant $C \leq M\omega^2$.

6. In a centrifugal instruction device, a rotating support, a mass of simple and regular geometric form rotating with the support and mounted to permit outward movement under the action of centrifugal force means for establishing a definite radius of rotation indicating that the center of mass is located at a predetermined radius, a helical spring operatively connected with the mass with its axis in line with the center of gravity of the mass and offering centripetal force to resist outward movement of the mass and means to establish measurable radius of rotation for the center of gravity of the mass of the rotating body.

7. In a centrifugal instruction device, a rotating support, a mass rotating with the support and mounted to permit outward movement under the action of centrifugal force and a helical spring operatively connected with the mass with its axis in line with the center of gravity of the mass and offering centripetal force to resist outward movement of the mass, said spring having a constant $C \leq M\omega^2$.

8. In a centrifugal instruction device, the combination of an oblong frame mounted to rotate about a vertical axis transverse to the length of the frame, a mass carried by the frame mounted to move outwardly with respect to the axis of rotation, a helical spring opposing the outward movement of the mass and having one end fixed to the frame and the other end operatively connected with the mass in line with the center of gravity, and means operated by the movement of the mass for indicating when the center of gravity of the mass is at a selected distance from the axis of rotation.

9. In a centrifugal instruction device, the combination of an oblong support mounted to rotate about a vertical axis transverse to the support, means for indicating on the support the plane of the axis of rotation, a mass carried by one end of the support and mounted to move outwardly under the action of centrifugal force, means to indicate on the mass the plane of the center of gravity thereof, a counter-weight carried by the opposite end of the support tending to produce dynamic balance, a helical spring having one end connected with the support at one side of the axis of rotation and the other end connected with the mass and offering centripetal force to resist the outward movement of the mass.

10. In a centrifugal instruction device, the combination of a support mounted to rotate about a vertical axis transverse thereto, means to indicate on the support the plane of the axis of rotation, a mass carried by the support and mounted to permit outward movement under the action of centrifugal force, means on the mass to indicate the location of the center of gravity thereof, an index on the support in line with the axis of rotation and a pointer operated by the movement of the mass and having one end adjacent to the index.

11. In a centrifugal instruction device, the combination of a support mounted to rotate about a vertical axis, means to indicate on the support the plane of the axis of rotation, a mass pivotally mounted on the support on an axis at one side of the center of gravity of the mass and at one side of the axis of rotation of the mass, means to indicate on the mass the location of the center of gravity thereof, means for exerting increasing centripetal force upon the mass as it swings away from the axis of rotation, an index coaxial with the axis of rotation and a pointer operated by movement of the mass and having one end adjacent to the index.

12. In a centrifugal instruction device, the combination of an oblong frame including a top, a bottom, and ends connecting the top and bottom, a mass movably mounted on the frame adjacent to one end and adapted to move outwardly under the action of centrifugal force, a counter-weight mounted adjacent to the opposite end and tending to create dynamic balance and a helical spring operatively connected with the support and the mass with its axis in line with the center of gravity of the mass.

13. In a centrifugal instruction device, a rotating support, a mass rotating with the support and mounted to permit outward movement under the action of centrifugal force and a helical spring crossing the axis of rotation and operatively connected with the mass with its axis in line with the center of gravity of the mass and offering centripetal force to resist outward movement of the same, such centripetal force increasing with the outward movement more rapidly than the centrifugal force increases.

14. In a centrifugal instruction device, a rotating support, a mass rotating with the support and mounted to permit outward movement under the action of centrifugal force and a helical spring operatively connected with the mass with its axis in line with the center of gravity of the mass and offering centripetal force to resist outward movement of the same, said spring having a constant such that the centripetal force at equilibrium is produced by an elongation of the spring nearly equal to the radius of rotation of the mass.

In testimony whereof I affix my signature.

PAUL E. KLOPSTEG.